(12) United States Patent
Yang et al.

(10) Patent No.: US 8,369,089 B2
(45) Date of Patent: Feb. 5, 2013

(54) FIXING ASSEMBLY

(75) Inventors: Xin Yang, Shenzhen (CN); Wei Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 434 days.

(21) Appl. No.: 12/770,772

(22) Filed: Apr. 30, 2010

(65) Prior Publication Data

US 2011/0139951 A1   Jun. 16, 2011

(30) Foreign Application Priority Data

Dec. 16, 2009   (CN) .......................... 2009 1 0311633

(51) Int. Cl.
*G06F 1/16* (2006.01)

(52) U.S. Cl. ..... 361/685; 361/683; 361/684; 248/224.3; 248/309.1

(58) Field of Classification Search ............... 248/309.1, 248/27.3, 224.3; 361/679.33, 679.32, 726
See application file for complete search history.

(56) References Cited

U.S. PATENT DOCUMENTS

| 6,619,766 | B1 * | 9/2003 | Mansueto | 312/223.1 |
| 7,440,271 | B2 * | 10/2008 | Chen et al. | 361/679.33 |
| 7,450,376 | B2 * | 11/2008 | Chen et al. | 361/679.33 |
| 7,518,857 | B2 * | 4/2009 | Chen et al. | 361/679.33 |
| 2003/0090869 | A1 * | 5/2003 | Liu et al. | 361/685 |
| 2005/0052841 | A1 * | 3/2005 | Chen et al. | 361/685 |

* cited by examiner

*Primary Examiner* — Amy J Sterling
(74) *Attorney, Agent, or Firm* — Altis Law Group, Inc.

(57) ABSTRACT

A fixing assembly for fixing a peripheral device having a positioning member is provided. The fixing assembly includes a bracket and a latching mechanism. The bracket is configured for accommodating the peripheral device. The latching mechanism is configured for fixing the peripheral device to the bracket. The bracket defines a guiding slot. The positioning member is slidable along the guiding slot. The latching mechanism includes a base and a latching portion slidably coupled to the base. The base is fixed to the bracket. The base defines a sliding slot corresponding to the guiding slot. The latching portion is slidably received in the sliding slot. When the peripheral device is inserted into the bracket at a predetermined position, the latching portion cooperates with the positioning member to fix the peripheral device to the bracket.

18 Claims, 5 Drawing Sheets

FIXING ASSEMBLY

BACKGROUND

1. Technical Field

The present disclosure relates to fixing assemblies, and more particularly to a fixing assembly for fixing a peripheral device to a computer case.

2. Description of Related Art

A peripheral device of a computer such as CD-ROM drive, DVD (digital versatile disk) drive, etc., is generally fixed in the computer case by a plurality of fixing members, such as bolts or screws. However, it takes a lot of time to assemble the peripheral device to the computer case with the bolts or screws.

Therefore, a need exist to provide a fixing assembly for a computer case for overcoming or alleviating the described shortcomings and deficiencies.

BRIEF DESCRIPTION OF THE DRAWINGS

The components of the drawings are not necessarily drawn to scale, the emphasis instead being placed upon clearly illustrating the principles of the embodiments of a fixing assembly and a computer case using the same. Moreover, in the drawings, like reference numerals designate corresponding parts throughout several views.

DETAILED DESCRIPTION

Figure 1:
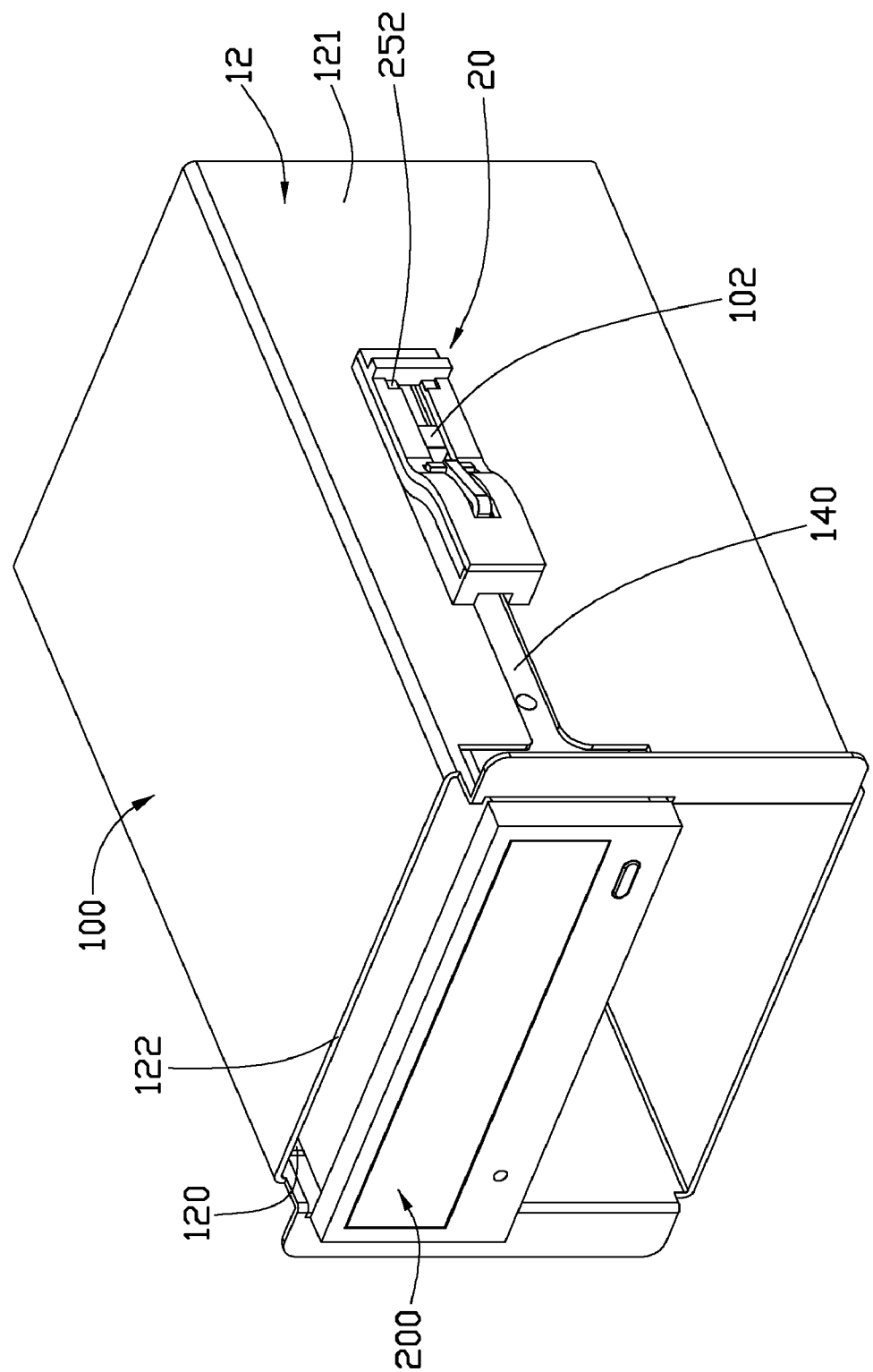
FIG. 1 is a perspective view of a fixing assembly in accordance with one embodiment; the fixing assembly is fixed to a computer case and is for accommodating a DVD drive.

Referring to FIG. 1, a fixing assembly 100 for fixing a peripheral device 200 in accordance with an embodiment is shown. The fixing assembly 100 includes a bracket 12 and a fixing mechanism 20. The bracket 12 is mounted on a computer case (not shown), and is configured to accommodate a peripheral device 200, such as a CD-ROM drive, a DVD drive, etc. In the embodiment, the peripheral device 200 is a DVD drive. A positioning member 102 is mounted on a sidewall of the DVD drive 200. The fixing mechanism 20 is mounted on the bracket 12, and cooperates with the positioning member 102 to hold the DVD drive 200 after the DVD drive 200 is accommodated in the bracket 12.

Figure 2:
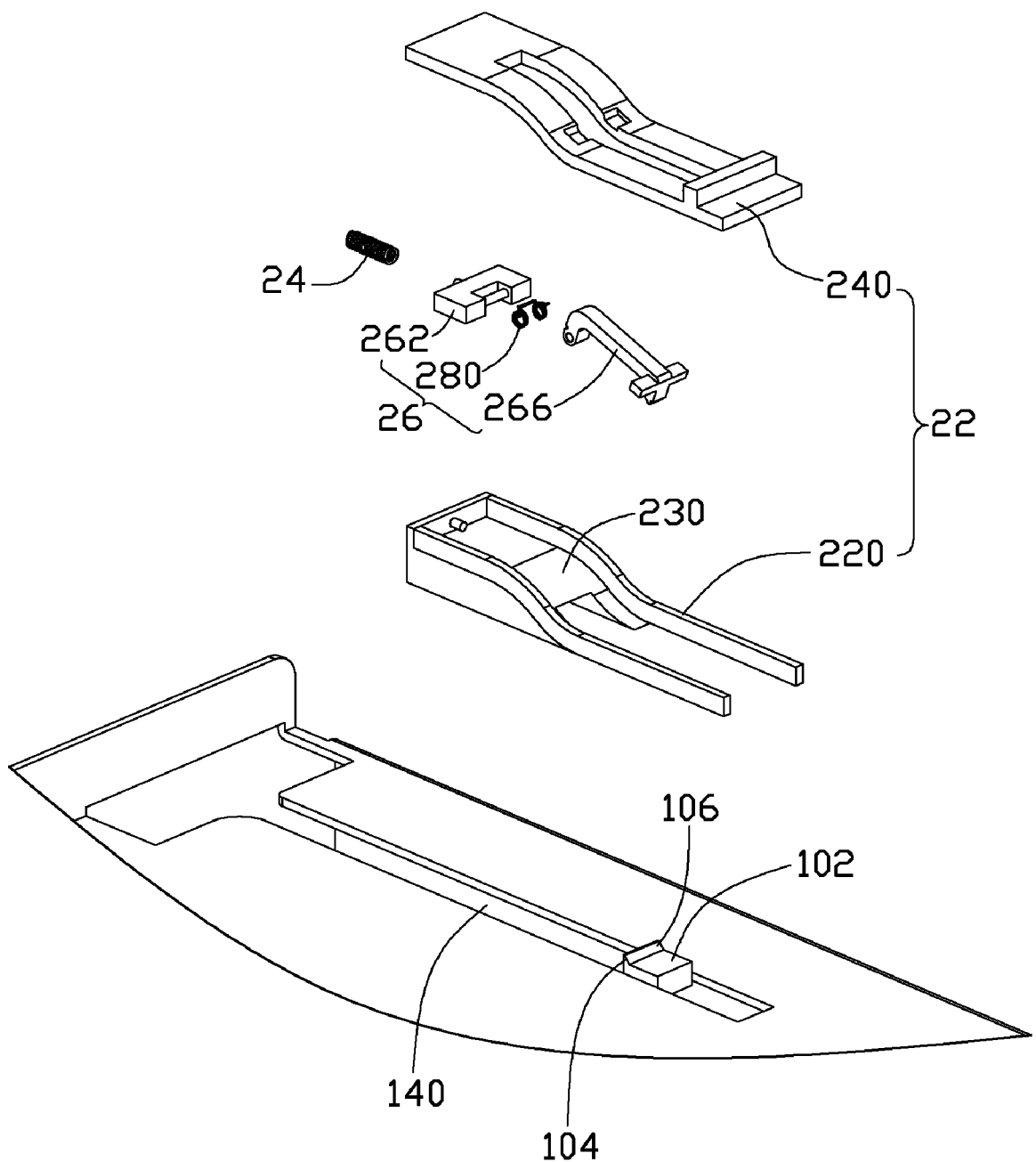
FIG. 2 is a partially disassembled perspective view of the fixing assembly of FIG. 1.

Referring to FIG. 2, the positioning member 102 is substantially rectangular. An engaging protrusion 104 protrudes from an end of the positioning member 102. The engaging protrusion 104 further defines a first inclined surface 106.

A receiving space 120 is defined in the bracket 12, thus the bracket 12 is substantially a hollow parallelepiped. The receiving space 120 is for accommodating the DVD drive 200. The receiving space 120 defines a rectangular opening 122, such that the DVD drive 200 is capable of being withdrawn from and being inserted into the bracket 12 through the opening 122. The bracket 12 includes opposite sidewalls 121. One of the sidewalls 121 corresponding to the positioning member 102 defines a guiding slot 140. The positioning member 102 slides along the guiding slot 140 while the DVD drive 200 is inserted into the bracket 12. The fixing mechanism 20 is mounted on the sidewall 121 and faces the guiding slot 140. To insert the DVD drive 200 into the receiving space 120, the positioning member 102 is inserted into a wider portion of the guiding slot 140 adjacent to the opening 122, and then slides along a narrower portion of the guiding slot 140 connected to the wider portion. When the positioning member 102 slides to a predetermined position of the narrower portion of the guiding slot 140, the fixing mechanism 20 holds the positioning member 102, such that the DVD drive 200 is fixed to the bracket 12.

Furthermore, a plurality of cushioning members (not shown), such as springs, is mounted on an inner surface of the bracket 12. The cushioning members face the opening 122. Thus, when the DVD drive 200 is fixed to the bracket 12, the cushioning members can elastically deform to provide cushioning for protecting the DVD drive 200 from impacts. When the DVD drive 200 is disassembled, the DVD drive 200 is driven to slide out of the receiving space 120 by virtue of the restoration of the deformed cushioning members.

Figure 3:
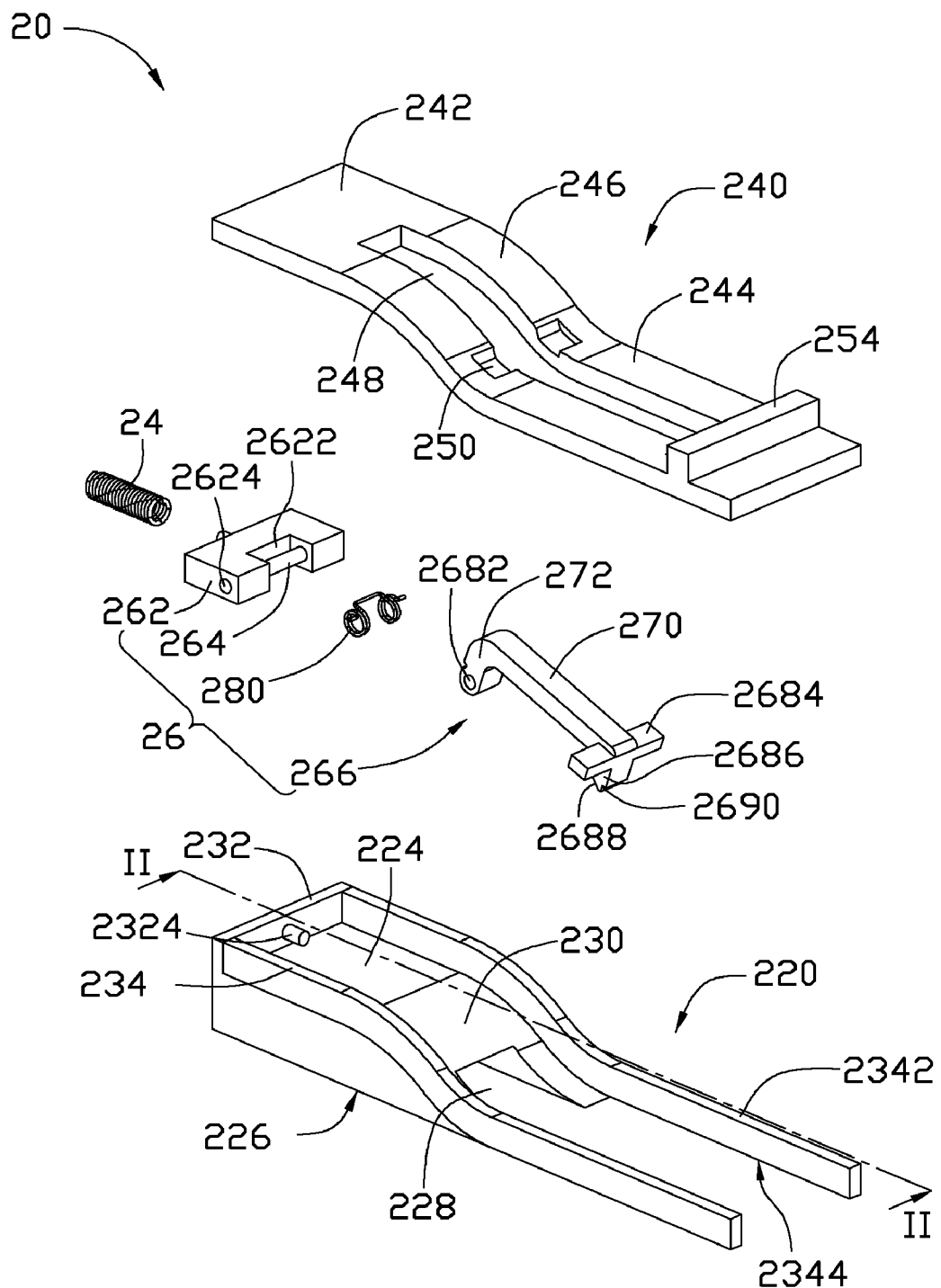
FIG. 3 is an enlarged view of a part of the fixing assembly of FIG. 2.

Referring also to FIG. 3, the fixing mechanism 20 includes a base 22, a first elastic element 24, and a latching portion 26. Opposite ends of the first elastic element 24 are fixed to the base 22 and the latching portion 26 respectively. The latching portion 26 is slidable relative to the base 22.

The base 22 includes a sliding plate 220 and a positioning plate 240 covering on the sliding plate 220. A cross-section along line II-II of the sliding plate 220 is substantially trapezoidal. The sliding plate 220 includes a top surface 224 and a bottom surface 226 opposite to the top surface 224. The sliding plate 220 defines a moderately curved surface 230. The curved surface 230 is connected between a rim of the top surface 224 and a rim of the bottom surface 226. The bottom surface 226 defines a groove 228. The groove 228 corresponds to the guiding slot 140. The groove 228 cooperates with the guiding slot 140, such that the positioning member 102 is slidable relative to the fixing assembly 100. The groove 228 extends in a direction parallel to a direction the guiding slot 140 extends, and further extends through the curved surface 230.

A stopping block 232 protrudes from another rim of the top surface 224 opposite to the curved surface 230. A protruding post 2324 further protrudes from the stopping block 232. The protruding post 2324 is arranged in the middle of the stopping block 232 and faces the top surface 224. The first elastic element 24 is fixed to the protruding post 2324 of the base 22. Two strip protruding blocks 234 protrude from opposite ends of the stopping block 232. The protruding block 234 extends along the top surface 224 and the curved surface 230 to the bottom surface 226, and further extends in a direction parallel to the bottom surface 226. The protruding block 234 includes a first curved surface 2342 and a second curved surface 2344 opposite to the first curved surface 2342. The first and second curved surfaces 2342, 2344 are parallel to each other.

The positioning plate 240 is substantially curved. The positioning plate 240 is parallel to the first and second surfaces 2342, 2344 of the protruding block 234. The positioning plate 240 is fixed to the sliding plate 220 by being attached to the first surface 2342.

The positioning plate 240 includes a first planar portion 242, a second planar portion 244, and a curved portion 246. The first planar portion 242 corresponds to the top surface 224 of the sliding plate 220. The second planar portion 244 is attached to a portion of the protruding block 234 extending farther from the sliding plate 220. The curved portion 246 corresponds to the moderate curved surface 230 of the sliding plate 220, and is connected between the first planar portion 242 and the second planar portion 244.

The middle of the positioning plate 240 defines a sliding slot 248. The sliding slot 248 extends from an end of the first planar portion 242 adjacent to the curved portion 246 to an end of the second planar portion 244 opposite to the curved portion 246. A first recess 250 is defined at the joint of the moderate curved portion 246 and the second planar portion 244. The second planar portion 244 defines a second recess 252 (see FIG. 1). The second recess 252 is arranged at an end of the sliding slot 248 opposite to the curved portion 246. The first and second recesses 250, 252 extend in a direction perpendicular to a direction the sliding slot 248 extends. A strip-shaped first stopper 254 protrudes from the second planar portion 244, and is adjacent to the second recess 252. The first stopper 254 is parallel to the direction the first and second recesses 250, 252 extend.

The latching portion 26 includes a sliding block 262, a pivot rod 264, a latching member 266, and a second elastic element 280. The sliding block 262 is fixed to an end of the first elastic element 24, and is slidable relative to the sliding plate 220. The latching member 266 is rotatably coupled to the sliding block 262 via the pivot rod 264. The second elastic element 280 sleeves on the pivot rod 264. The sliding block 262 and the latching member 266 are coupled to opposite ends of the second elastic element 280 respectively, such that the latching member 266 is elastically held at a desired angle to the sliding block 262. In the embodiment, the second elastic element 280 is a torsion spring.

The sliding block 262 defines a rectangular opening 2622. The sliding block 262 further defines two first through holes 2624. The rectangular opening 2622 is disposed between the two first through holes 2624, and communicates with the two first through holes 2624. The two first through holes 2624 are configured to receive the pivot rod 264.

The latching member 266 is substantially L-shaped. The latching member 266 includes a first arm 270 and a second arm 272. The first arm 270 is substantially perpendicular to the second arm 272. The second arm 272 is slidably received in the sliding slot 248. An end of the second arm 272 defines a second through hole 2682 away from the first arm 270. A positioning block 2684 protrudes from an end of the first arm 270 away from the second arm 272. The positioning block 2684 is perpendicular to the first and second arms 270, 272. The positioning block 2684 is capable of being received in the first and second recesses 250, 252.

A latching protrusion 2686 protrudes from the positioning block 2684. The latching protrusion 2686 is substantially parallel to the second arm 272. The latching protrusion 2686 defines a second inclined surface 2688. The second inclined surface 2688 corresponds to the first inclined surface 106 of the engaging protrusion 104. An end of the latching protrusion 2686 opposite to the protruding block 234 defines a notch 2690. The notch 2690 is configured to receive the engaging protrusion 104.

Figure 5:
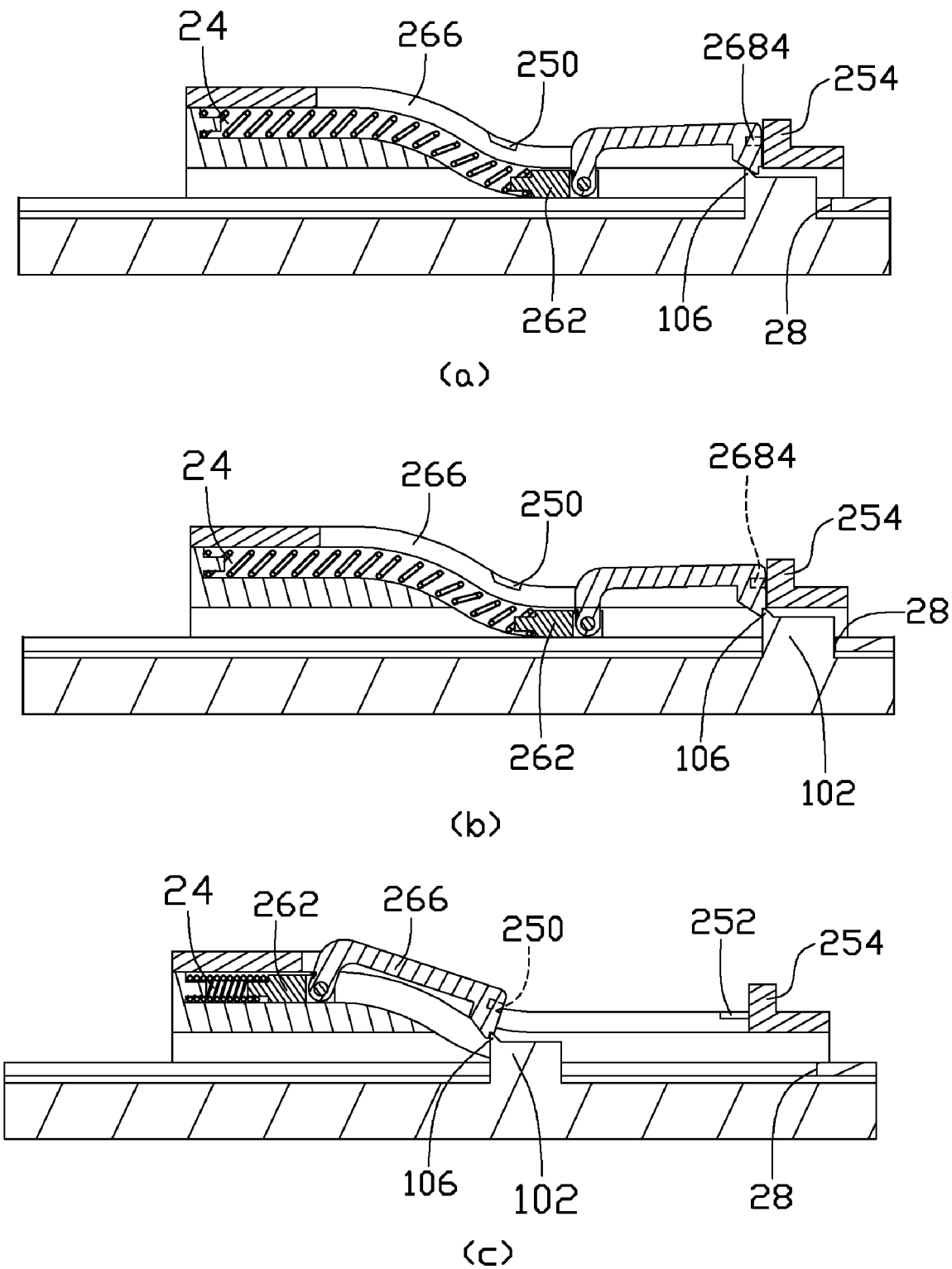
FIG. 5 is an explanatory view for explaining a process of the DVD drive being disassembled from the fixing assembly of FIG. 1.

Referring also to FIG. 5, the fixing assembly 100 further includes a second stopper 28. The second stopper 28 is attached to the sidewall 121 of the bracket 12. The second stopper 28 is arranged at a predetermined position of the guiding slot 140 to prevent the positioning member 102 sliding farther. Referring further to FIG. 5(b), in the embodiment, when the positioning member 102 slides to the second stopper 28, the notch 2690 exactly engages with the engaging protrusion 104, and the positioning block 2684 is raised to separate from the second recess 252.

Figure 4:
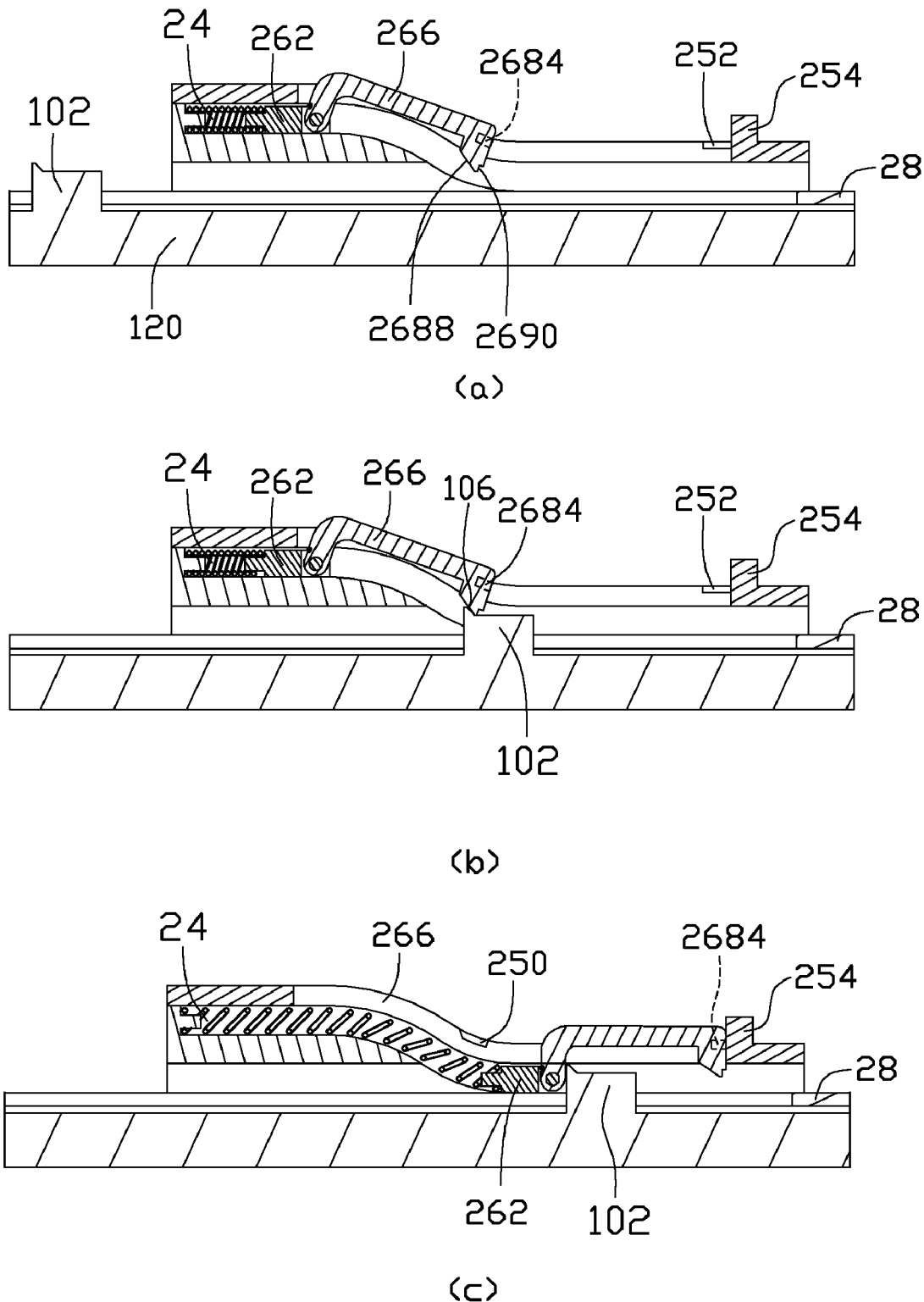
FIG. 4 is an explanatory view for explaining a process of the DVD drive being assembled into the fixing assembly of FIG. 1.

Referring to FIG. 4(a), after assembly, the positioning block 2684 is received in the first recess 250, the sliding block 262 of the latching portion 26 is located at the top surface 224 of the sliding plate 220, and the first elastic element 24 elastically deforms by virtue of being pressed by the sliding block 262. In this state, the latching portion 26 is said to be in an original state.

Referring to FIG. 4(b), to assembly the DVD drive 200, insert the DVD drive 200 into the opening 122 of the bracket 12 via an external force, and further slide the DVD drive 200 into the receiving space 120 till the DVD drive 200 deforms the cushioning member. In the assembly process of the DVD drive 200, the positioning member 102 slides along the guiding slot 140. When the positioning member 102 slides to a position under the first recess 250, the first inclined surface 106 engages with the second inclined surface 2688. As a result, the positioning block 2684 is raised and separated from the first recess 250 by the first inclined surface 106 engaging with the second inclined surface 2688.

Referring to FIG. 4(c), the first elastic element 24 rebounds to slide the latching portion 26 toward the second recess 252. When the latching protrusion 2686 slides to the first stopper 254, the positioning block 2684 is latched to the second recess 252. Upon release of the external force, the cushioning members rebound, and the DVD drive 200 is sandwiched between the sliding block 262 and the cushioning members. As a result, the DVD drive 200 is fixed to the bracket 12.

Referring to FIG. 5(a), to disassemble the DVD drive 200, push the DVD drive 200 to press the cushioning members till the positioning member 102 is stopped by the second stopper 28. In the process of disassembling the DVD drive 200, when the positioning member 102 slides to a position under the second recess 252, the first inclined surface 106 engages with the second inclined surface 2688 again, and the positioning block 2684 is raised and separated from the second recess 252 by the first inclined surface 106 engaging with the second inclined surface 2688.

Referring to FIGS. 5(b)-5(c), when the positioning member 102 is stopped by the second stopper 28, the positioning block 2684 separates from the second recess 252, and the notch 2690 receives the engaging protrusion 104. Thus, when the DVD drive 200 is withdrawn from the receiving space 120, the positioning member 102 drives the latching portion 26 to return to the original position by virtue of the notch 2690 engaging with the engaging protrusion 104. Because of the twisting force of the second elastic element 280, the positioning block 2684 is latched into the first recess 250 again.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A fixing assembly for fixing a peripheral device with a positioning member, the fixing assembly comprising:
   a bracket adapted to accommodate the peripheral device; and
   a latching mechanism adapted to fix the peripheral device to the bracket;
   wherein the bracket defines a guiding slot for the positioning member sliding along, the latching mechanism comprises a base fixed to the bracket and a latching portion slidably coupled to the base, the base defines a sliding slot corresponding to the guiding slot, the latching portion is slidably received in the sliding slot, when the peripheral device slides along the guiding slot to be inserted into the bracket and stops at a predetermined position, the latching portion cooperates with the positioning member to fix the peripheral device to the bracket;

wherein the base comprises a sliding plate and a positioning plate covering the sliding plate, the base defines a groove corresponding to the guiding slot, and the groove cooperates with the guiding slot to allow the positioning member to slide through the base.

2. The fixing assembly of claim 1, wherein the bracket defines a receiving space, the peripheral device is accommodated in the receiving space.

3. The fixing assembly of claim 2, wherein the receiving space defines an opening, the peripheral device is inserted into and withdrawn from the bracket via the opening.

4. The fixing assembly of claim 3, wherein the bracket comprises opposite sidewalls, one of the sidewalls defines the guiding slot, and the guiding slot extends in a direction parallel to the direction the peripheral device being inserted into the bracket.

5. The fixing assembly of claim 1, wherein the sliding plate comprises a top surface, a bottom surface parallel to the top surface, and a curved surface, the curved surface connects between a rim of the top surface and a rim of the bottom surface, the latching portion is slidable along the curved surface from the top surface to the bottom surface.

6. The fixing assembly of claim 1, wherein the positioning plate defines the sliding slot corresponding to the guiding slot, the latching portion is slidable relative to the sliding plate along the guiding slot, the positioning plate further defines a first and second recesses, when the positioning member slides along the guiding slot to a position under the first recess, the latching portion separates from the first recess, and the latching portion slides to and is received in the second recess.

7. The fixing assembly of claim 6, wherein when the latching portion is received in the second recess, the latching portion holds the positioning member such that the peripheral device is fixed to the bracket.

8. The fixing assembly of claim 6, further comprising a first elastic element, the latching portion coupled to the sliding plate via the first elastic element, wherein when the latching portion is received in the first recess, the first elastic element elastically deforms to drive the latching portion to slide to the second recess when the latching portion separates from the first recess.

9. The fixing assembly of claim 6, wherein the latching portion comprises a sliding block and a latching member rotatably coupled to the sliding block, the latching member is slidable along the sliding slot, and is capable of being received in the first and second recesses.

10. The fixing assembly of claim 9, wherein the latching portion further comprises a second elastic element, the latching member and the sliding block are fixed to opposite ends of the second elastic element, such that the latching member is elastically held at desired angle to the sliding block.

11. The fixing assembly of claim 10, wherein the latching member comprises a protruding block, the protruding block defines an inclined surface and a notch opposite to the inclined surface, the latching member is raised when the inclined surface is pressed by the positioning member, and the latching member is driven to slide when the notch engages with the positioning member.

12. The fixing assembly of claim 11, further comprising a stopper, the stopper fixed to the bracket, wherein when the positioning member slides to the stopper, the notch engages with the positioning member.

13. A fixing assembly for fixing a peripheral device with a positioning member, the fixing assembly comprising:
a bracket adapted to accommodate the peripheral device; and
a latching mechanism adapted to fix the peripheral device to the bracket;
wherein the latching mechanism is slidable relative to the bracket, the bracket defines a guiding slot, the positioning member is slidable along the guiding slot, the guiding slot defines a first position and a second position, when the positioning member slides to the first position, the latching mechanism is unlatched from the bracket and is allowed to slide to and be located at the second position;
wherein the latching mechanism comprises a base fixed to the bracket and a latching portion slidably coupled to the base, the base comprises a sliding plate and a positioning plate covering the sliding plate, the base defines a groove corresponding to the guiding slot, the groove cooperates with the guiding slot to allow the positioning member to slide through the base.

14. The fixing assembly of claim 13, wherein when the latching mechanism is located at the second position, the positioning member cooperates with the latching mechanism to fix the peripheral device to the bracket.

15. The fixing assembly of claim 14, wherein when the positioning member slides to the second position, the latching mechanism is unlatched from the bracket, the positioning member engages with the latching mechanism to allow the peripheral device to be withdrawn from the bracket.

16. A fixing assembly for fixing a peripheral device having a positioning member, the fixing assembly comprising:
a bracket for accommodating the peripheral device; and
a latching mechanism comprising a base fixed to the bracket and a latching portion, the latching portion capable of sliding relative to the base to switch between a first position and a second position, the latching portion cooperating with the positioning member to fix the peripheral device to the bracket when at the first position, and detach from the positioning member at the second position thus the peripheral device is capable of being removed from the bracket;
wherein the bracket defines a guiding slot, the base comprises a sliding plate and a positioning plate covering the sliding plate, the base defines a groove corresponding to the guiding slot, the groove cooperates with the guiding slot to allow the positioning member to slide through the base.

17. The fixing assembly of claim 13, wherein the positioning plate defines the sliding slot corresponding to the guiding slot, the latching portion is slidable relative to the sliding plate along the guiding slot, the positioning plate further defines a first and second recesses, when the positioning member slides along the guiding slot to a position under the first recess, the latching portion separates from the first recess, and the latching portion slides to and is received in the second recess.

18. The fixing assembly of claim 16, wherein the positioning plate defines the sliding slot corresponding to the guiding slot, the latching portion is slidable relative to the sliding plate along the guiding slot, the positioning plate further defines a first and second recesses, when the positioning member slides along the guiding slot to a position under the first recess, the latching portion separates from the first recess, and the latching portion slides to and is received in the second recess.

* * * * *